United States Patent
Harvey et al.

(10) Patent No.: US 9,651,122 B2
(45) Date of Patent: May 16, 2017

(54) DUAL ARM TENSIONER

(71) Applicant: GATES CORPORATION, Denver, CO (US)

(72) Inventors: John Harvey, Novi, MI (US); Oliver Stegelmann, Strathroy (CA)

(73) Assignee: Gates Corporation, Denver, CO (US)

( * ) Notice: Subject to any disclaimer, the term of this patent is extended or adjusted under 35 U.S.C. 154(b) by 169 days.

(21) Appl. No.: 14/615,151

(22) Filed: Feb. 5, 2015

(65) Prior Publication Data

US 2016/0230853 A1    Aug. 11, 2016

(51) Int. Cl.
| | | |
|---|---|---|
| F16H 7/12 | (2006.01) | |
| F02N 15/08 | (2006.01) | |
| F16H 7/08 | (2006.01) | |

(52) U.S. Cl.
CPC .............. *F16H 7/129* (2013.01); *F02N 15/08* (2013.01); *F16H 7/1281* (2013.01); *F16H 2007/081* (2013.01); *F16H 2007/0806* (2013.01); *F16H 2007/0865* (2013.01); *F16H 2007/0874* (2013.01); *F16H 2007/0893* (2013.01)

(58) Field of Classification Search
CPC ....... F16H 2007/0806; F16H 2007/081; F16H 2007/0865; F16H 2007/0874; F16H 2007/0893; F16H 7/1218; F16H 7/1281; F16H 7/129
USPC .................................................. 474/117, 134
See application file for complete search history.

(56) References Cited

U.S. PATENT DOCUMENTS

| | | | |
|---|---|---|---|
| 7,494,434 B2 | 2/2009 | McVicar et al. | |
| 8,092,328 B2 | 1/2012 | Dec et al. | |
| 9,341,243 B2* | 5/2016 | Replete | F16H 7/1218 |
| 2002/0039944 A1 | 4/2002 | Ali et al. | |
| 2006/0287146 A1 | 12/2006 | McVicar et al. | |
| 2007/0037648 A1 | 2/2007 | Di Giacomo et al. | |
| 2008/0214342 A1 | 9/2008 | Montani et al. | |
| 2013/0260932 A1 | 10/2013 | Adam et al. | |
| 2015/0051033 A1* | 2/2015 | Replete | F16H 7/1218 |
| | | | 474/117 |
| 2015/0308545 A1* | 10/2015 | Harvey | F16H 7/1218 |
| | | | 474/117 |
| 2015/0345597 A1* | 12/2015 | Walter | F16H 7/1218 |
| | | | 474/134 |

FOREIGN PATENT DOCUMENTS

WO    WO2013142951    * 10/2013    ........... F16H 7/1281

OTHER PUBLICATIONS

European Patent Office, International Search Report application No. PCT/US2016/014228, Mailing date Apr. 6, 2016.

* cited by examiner

*Primary Examiner* — William E Dondero
*Assistant Examiner* — Robert T Reese
(74) *Attorney, Agent, or Firm* — Jeffrey A. Thurnau, Esq.; Paul N. Dunlap, Esq.

(57) ABSTRACT

A tensioner comprising a first pivot arm having a first pulley journalled thereto and engagable with a mounting surface through a first pivot axis, a second pivot arm having a second pulley journalled thereto, the second pivot arm pivotally engaged to the first pivot arm through a second pivot axis, the second pivot axis disposed from the first pivot axis, a biasing member engaged between the first pivot arm and the second pivot arm urging the first pulley toward the second pulley, and the second pivot axis is between the first pulley and the first pivot axis.

7 Claims, 3 Drawing Sheets

DUAL ARM TENSIONER

FIELD OF THE INVENTION

The invention relates to a tensioner, and more particularly, to a dual arm tensioner having a first pivot arm having a first pulley journalled thereto and engagable with a mounting surface through a first pivot axis, a second pivot arm having a second pulley journalled thereto, the second pivot arm pivotally engaged to the first pivot arm through a second pivot axis, the second pivot axis disposed from the first pivot axis.

BACKGROUND OF THE INVENTION

Tensioners are used to apply a preload to belts used in engine accessory drives. A tensioner will typically comprise a pivot arm mounted to a base. A spring between the pivot arm and base urges the pivot arm, and a pulley journalled thereto, into engagement with a belt. This will apply a preload to the belt which assures proper power transmission from the belt to a driven accessory such as an alternator.

Belt alternator starter (BAS) systems for hybrid vehicles differ from conventional accessory drive belt systems in that the torque to turn the system is not always generated from the crankshaft. During normal operation the engine crankshaft provides torque for rotating a motor generator (MG) unit, or starter generator, generally providing taut and slack sides of the belt on opposite sides of the MG pulley. During engine starting, the MG unit drives the system causing the slack side of the belt to switch to the opposite side of the MG unit. Accordingly, two belt tensioners are generally required in such systems, engaging the belt on opposite sides of the MG pulley.

During normal engine driven operation of the generator and other accessories, the loads placed on the belt drive are determined by the power required to drive the accessories, including the MG unit. These accessory drive loads are relatively light and accordingly require belt tensioning only at a moderate low level. Contrariwise, during engine starting, the motor generator unit is required to provide power to rotate the engine as well as the connected accessories. This requires a higher level of belt tensioning to control motion on the slack side of the belt and assure that the belt will not slip. But the higher belt tension may put excessive tensioning loads on the belt and bearings of the system components during normal engine operation, which occupies the vast majority of operating time of the belt drive system. Also, because of packaging requirements it is usually necessary to provide separate tensioner arms with different pivot locations on each side of the MG unit to attain the necessary tensioner arm geometry. An improved accessory drive system, and belt tensioner are accordingly desired.

Representative of the art is U.S. Pat. No. 7,494,434 which discloses an accessory drive for an engine has a belt driven starter generator adapted for driving and being driven by the engine. In an exemplary embodiment, the drive includes a first engine drive pulley and a second starter drive pulley. A drive belt engages the drive pulleys for driving either pulley from the other. A dual belt tensioner made as a preassembled unit has a carrier with a central pivot mounted to the engine and first and second carrier arms extending radially from the central pivot. A first tensioner mounted on the first arm carries a first tensioner pulley biased against a first belt run adjacent the second drive pulley that is slack during engine starting. A second tensioner pulley carried on the second arm is biased against a second belt run adjacent the second drive pulley that is taut during engine starting A hydraulic strut connected to the second arm, and preferably included in the preassembled unit, provides moderate biasing for the second tensioner pulley during normal engine operation and velocity sensitive resistance, to increased belt forces, that limits reactive movement of the second tensioner pulley during engine starting and transient engine operation.

What is needed is a dual arm tensioner having a first pivot arm having a first pulley journalled thereto and engagable with a mounting surface through a first pivot axis, a second pivot arm having a second pulley journalled thereto, the second pivot arm pivotally engaged to the first pivot arm through a second pivot axis, the second pivot axis disposed from the first pivot axis. The present invention meets this need.

SUMMARY OF THE INVENTION

The primary aspect of the invention is to provide a dual arm tensioner having a first pivot arm having a first pulley journalled thereto and engagable with a mounting surface through a first pivot axis, a second pivot arm having a second pulley journalled thereto, the second pivot arm pivotally engaged to the first pivot arm through a second pivot axis, the second pivot axis disposed from the first pivot axis.

Other aspects of the invention will be pointed out or made obvious by the following description of the invention and the accompanying drawings.

The invention comprises a tensioner comprising a first pivot arm having a first pulley journalled thereto and engagable with a mounting surface through a first pivot axis, a second pivot arm having a second pulley journalled thereto, the second pivot arm pivotally engaged to the first pivot arm through a second pivot axis, the second pivot axis disposed from the first pivot axis, a biasing member engaged between the first pivot arm and the second pivot arm urging the first pulley toward the second pulley, and the second pivot axis is between the first pulley and the first pivot axis.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
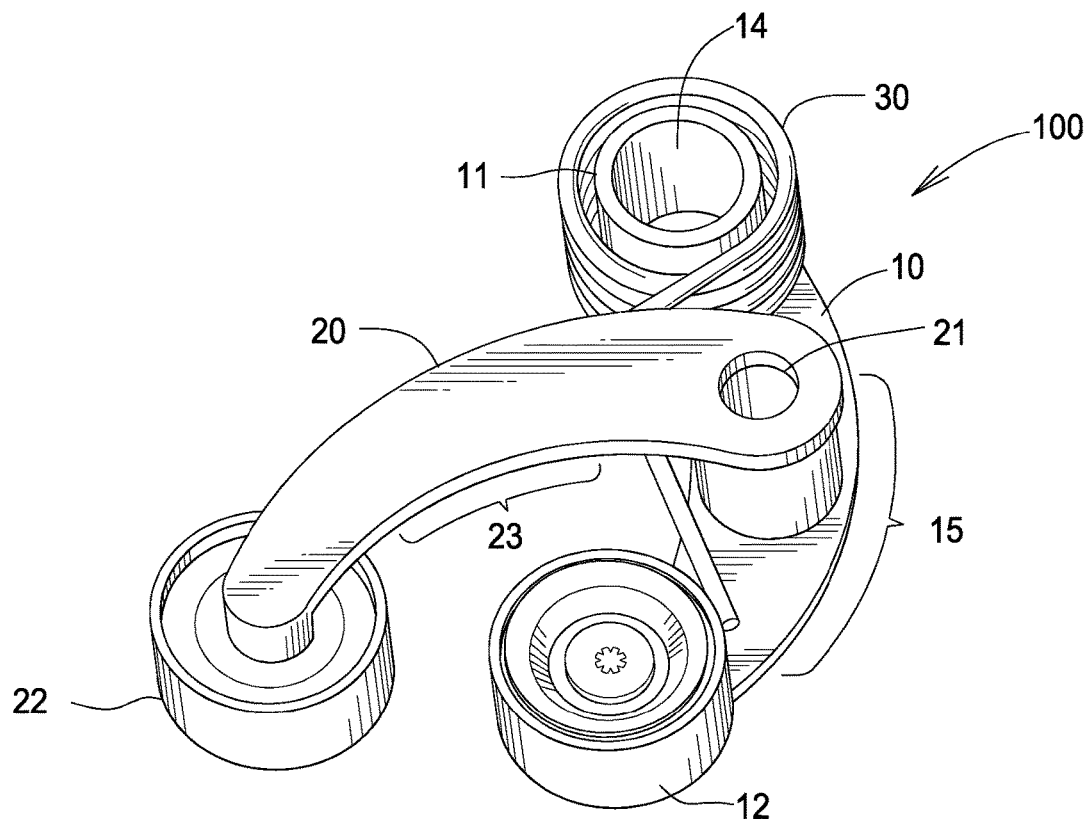
FIG. 1 is a top perspective view of the tensioner.

FIG. 1 is a top perspective view of the tensioner. Tensioner 100 comprises a first arm 10 and a second arm 20. Coil spring 30 urges first arm 10 toward second arm 20, which urges pulley 22 toward pulley 12.

First arm 10 pivots about pivot 11. Second arm 20 pivots about pivot 21. Pulley 12 is journalled to first arm 10. Pulley 22 is journalled to second arm 20.

Pivot 21 is disposed on first arm 10 between pivot 11 and pulley 12. Second pulley 22 is a greater radial distance than the first pulley 12 from the first pivot axis A-A when the tensioner is in the unloaded condition. Coil spring 30 is coiled about pivot axis A-A. Coil spring 30 is not coiled about axis B-B. The radial relationship of the first pulley and second pulley with respect to the first pivot axis may change according to the angular relationship of the first arm to the second arm in the unloaded condition.

The length of pivot arm 10 and pivot arm 20 may vary according to system requirements.

Figure 2:
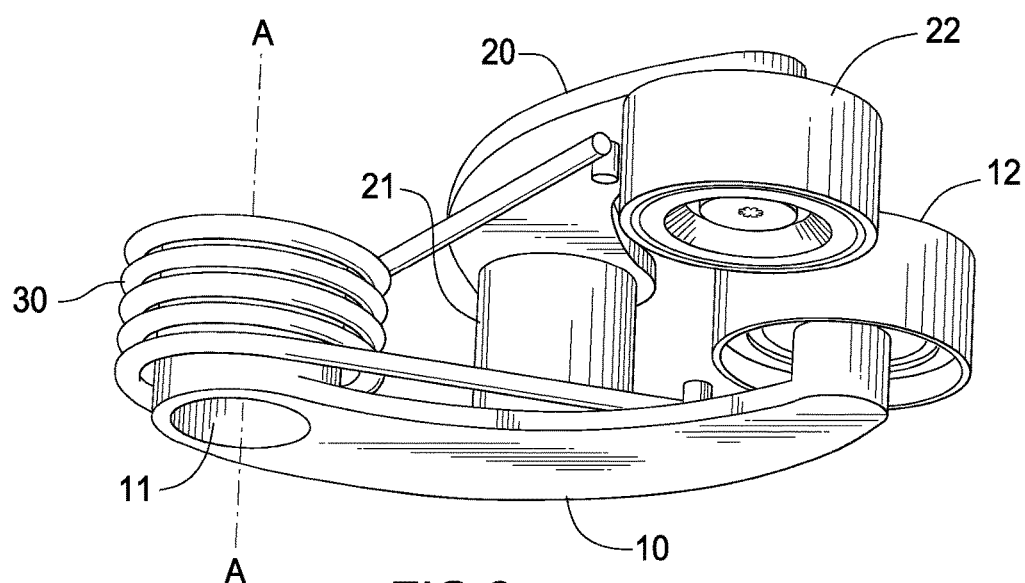
FIG. 2 is a bottom perspective view of the tensioner.

FIG. 2 is a bottom perspective view of the tensioner. Pivot 11 receives a fastener (not shown) through bore 14 for mounting the first arm 10 to a mounting surface (not shown). The mounting surface may comprise a case for an engine alternator, or a starter-generator, or other engine surface. Pivot 11 operates about axis A-A.

Figure 3:
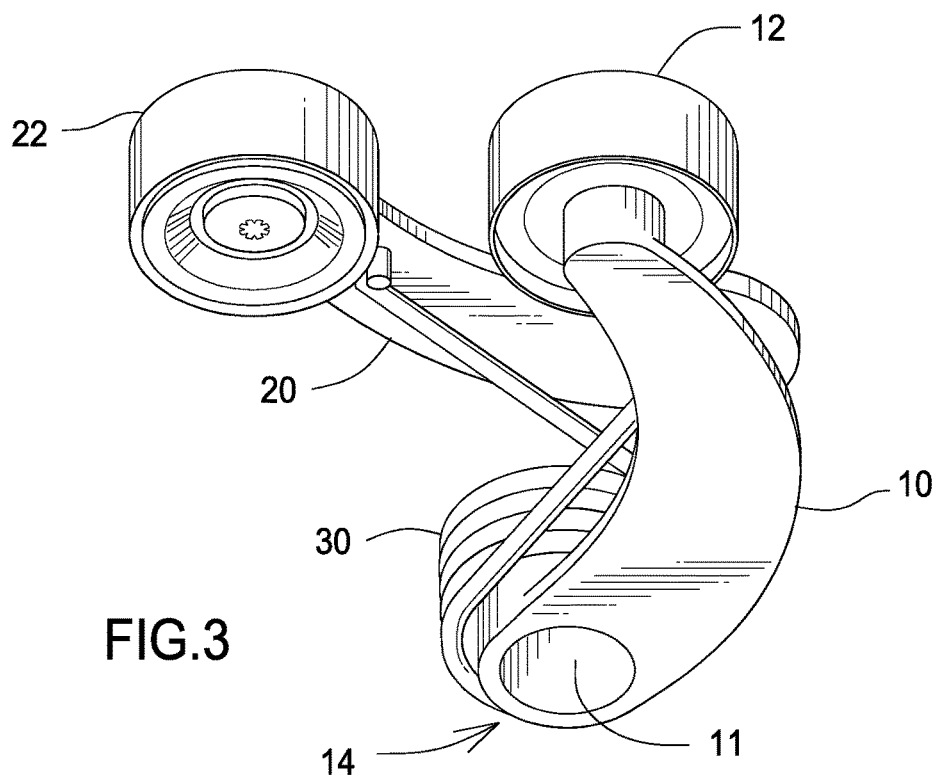
FIG. 3 is a bottom perspective view of the tensioner.

FIG. 3 is a bottom perspective view of the tensioner. First arm 10 is shown with an arcuate form 15, but any suitable shape will suffice. For example, linear or having an angular bend in addition to arcuate. The first arm is concave toward the second arm. The relationship of the first arm concave portion to the second arm may be changed or reversed according to the needs of a user.

Figure 4:
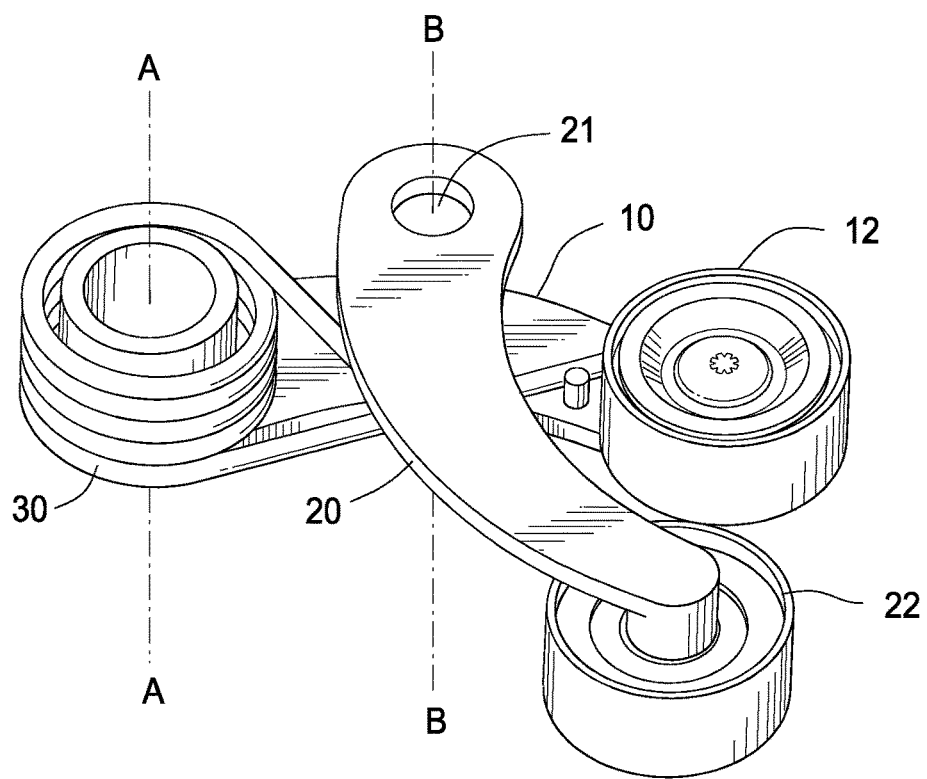
FIG. 4 is a top perspective view of the tensioner.

FIG. 4 is a top perspective view of the tensioner. Second arm 20 pivots about axis B-B. Second arm 20 is shown with an arcuate form 23, but any suitable shape will suffice. For example, linear or having an angular bend in addition to being arcuate. The second arm is concave toward the first arm. The relationship of the second arm concave portion to the first arm may be changed or reversed according to the needs of a user.

In an alternate embodiment the second pulley is a greater distance than the first pulley from the first pivot axis A-A in the unloaded condition. In yet another embodiment the first pulley is a greater distance than the second pulley from the second pivot axis B-B in the unloaded condition. In yet another embodiment the second pulley is a greater distance than the first pulley from the second pivot axis B-B in the unloaded condition.

Figure 5:
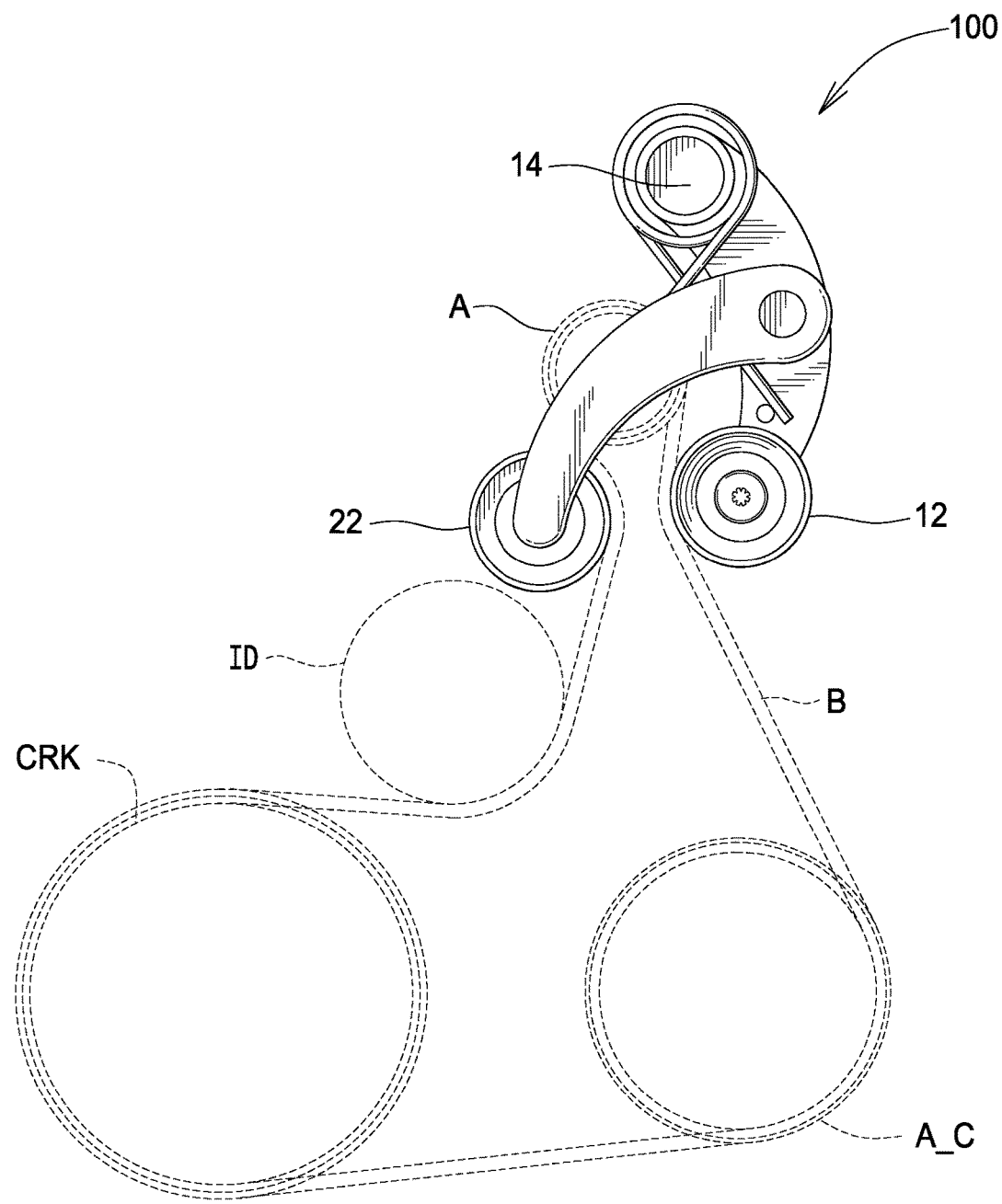
FIG. 5 is a system schematic view of the tensioner.

FIG. 5 is a system schematic view of the tensioner. Tensioner 100 is mounted to an alternator A. Belt B is routed about and engages a pulley mounted to each of alternator A, air conditioner compressor A-C, crankshaft CRK, and idler ID. Pulley 22 and pulley 12 bear upon belt B, thereby imparting a belt load. The belt load allows torque transmission to occur between the crankshaft and the noted components without slipping between the belt and the pulleys.

A tensioner comprising a first pivot arm having a first pulley journalled thereto and engagable with a mounting surface through a first pivot axis, a second pivot arm having a second pulley journalled thereto, the second pivot arm pivotally engaged to the first pivot arm through a second pivot axis, the second pivot axis disposed from the first pivot axis, a biasing member engaged between the first pivot arm and the second pivot arm urging the first pulley toward the second pulley, and the second pivot axis is between the first pulley and the first pivot axis.

Although a form of the invention has been described herein, it will be obvious to those skilled in the art that variations may be made in the construction and relation of parts and method without departing from the spirit and scope of the invention described herein.

We claim:

1. A tensioner comprising:
   a first pivot arm having a first pulley journalled thereto and engagable with a mounting surface through a first pivot axis;
   a second pivot arm having a second pulley journalled thereto;
   the second pivot arm pivotally engaged to the first pivot arm through a second pivot axis, the second pivot axis disposed from the first pivot axis;
   a biasing member coiled about the first pivot axis engaged with the first pivot arm and the second pivot arm urging the first pulley toward the second pulley; and
   the second pivot axis is between the first pulley and the first pivot axis.

2. The tensioner as in claim 1, wherein the first pivot arm has an arcuate form.

3. The tensioner as in claim 2, wherein the first pivot arm is concave toward the second pivot arm.

4. The tensioner as in claim 1, wherein the second pivot arm has an arcuate form.

5. The tensioner as in claim 4, wherein the second pivot arm is concave toward the first pivot arm.

6. The tensioner as in claim 1, wherein the second pulley is a greater distance than the first pulley from the first pivot axis in the unloaded condition.

7. The tensioner as in claim 1, wherein the second pulley is a greater distance than the first pulley from the second pivot axis in the unloaded condition.

* * * * *